Feb. 4, 1964     O. J. WOLFER     3,120,571
METHOD OF TIRE DIAMETER REGULATION IN POST INFLATION
Filed May 6, 1959     2 Sheets-Sheet 1

INVENTOR.
OTTO J. WOLFER
BY
ATTORNEY

INVENTOR.
OTTO J. WOLFER
BY
ATTORNEY

United States Patent Office 3,120,571
Patented Feb. 4, 1964

3,120,571
METHOD OF TIRE DIAMETER REGULATION
IN POST INFLATION
Otto J. Wolfer, Park Ridge, Ill., assignor to The Pure Oil
Company, Chicago, Ill., a corporation of Ohio
Filed May 6, 1959, Ser. No. 811,350
4 Claims. (Cl. 264—94)

This invention relates to a method of manufacturing inflatable fabric-reinforced articles, i.e., vehicle tires, and concerns itself particularly with the problem of regulating tire diameters and the prevention of unevenness or out-of-roundness in rubber tires and provides means for regulating and correcting tire diameters and tread radii.

Present day automobile tires are vastly improved over the first pneumatic structures that were used on automobiles during the early years of the industry. Changes have been made in tread design, the rubber composition, the cord and body constructions, the methods of manufacture and the types of reinforcing cords used. These changes have been cumulative to produce today's tire which is capable of sustained high-speed operation and provides the greatest safety against punctures, blow-outs and skidding. Nylon and rayon cord plies have greatly increased the strength and resiliency of the tire body. However, certain problems arise in the fabrication and curing of tires embodying synthetic fibers of this nature. The incorporation of synthetic fibers in a tire body introduces strains therein due to the differences in elasticity of the fibers and rubber. Also, and more important, is the fact that synthetic fibers, particularly nylon, as manufactured in filaments, are under tension which causes them to grow or shrink during the curing operations in the manufacturing process. This change in dimensions of the fibers is of a different degree than the normal growth of rubber known to take place during processing. As a result, the finished tire body contains: (1) areas wherein the nylon fibers are relaxed and do not function to give strength thereto, (2) areas wherein the nylon fibers are under tension and function to put undue stress on the rubber-nylon bond therebetween, and (3) areas where combinations of these forces are acting on the tire structure. As a result of the forces set up in the tire body there is a tendency for the cord plies to separate from the surrounding rubber and weaken the structure. Accordingly, the use of full-tensioned synthetic cords presents numerous difficulties in tire manufacture. Also, the added step of pre-tensioning the synthetic cords adds to the cost of the tire. In this process, using the "Bag-O-Matic" curing press, the tire is cured in a special mold for about 19–20 minutes at a temperature of about 285° F., removed from the mold and then allowed to cool.

In an effort to reduce the cost of tire building, the use of reduced-tensioned synthetic cord plies has come into being. This process also reduces the cost of processing the cord plies prior to incorporation into the tire body. A new automatic production method is in use to eliminate tire cord growth or shrinkage after the tire has been cured. This new method is called "post-inflation" and involves curing the tire in the usual manner using the "Bag-O-Matic" press, followed by automatically placing the tire on a rim, inflating to about 50 p.s.i. for an additional 19 minute cycle and allowing the tire to cool inflated.

It has been found that a tire which is at a temperature of about 285° F. and is immediately inflated to 50 p.s.i. is subject to an abnormal tire growth condition of the synthetic cord and rubber composition. In some instances tires produced by this method are being up-sized as much as one-half inch in diameter. Thus, a given amount of tire material calculated to produce a 7.50 x 14 tire will come from the process as a size 800 x 14 tire. This results in a wide variation in the tire diameters and tread radius contour shapes. There is no control of the dimensions of one finished tire to another after being processed in accordance with these methods.

In accordance with this invention, I have found that by using a control-ring, consisting of a rolled or cast steel rim of perfectly true radial and lateral dimensions, placed over the outside circumference of circular fabric-reinformed elastic articles, i.e., a tire, as same is being placed on the post-inflation rim, prevents these difficulties. The control-ring of this invention is placed over the tire after the first cycle of curing in the mold is completed and before the tire is inflated. During inflation the tire tread seats itself against the inner, even and uniform surface of the ring. As the tire grows through or during the post-inflation cycle, the tire tread surface is held to a uniform diameter until the cooling cycle is completed or until the predetermined post-inflating cycle is completed. By this method and means, tire diameter and uniformity is insured. This results in a finished tire which is adapted to roll at high speeds without vibration, uneven wear and with steady contact with the road surface.

Accordingly, it is an object of this invention to provide a method of making vehicle tires having uniform diameters and tread surfaces.

It is another object of this invention to provide a method of making automobile tires using reduced-tensioned or full-tensioned synthetic fibers wherein means are provided for controlling the radial growth of the tire during the post-inflation cycle.

These and other objects of this invention will be explained or be obvious as the description thereof proceeds. The invention is best explained by reference to the drawings wherein.

In order to describe the invention, reference will be made to the known art of tire manufacture and then to the drawings to illustrate the application of the instant device to the process. The essential ingredients of a tire are cold rubber, carbon black, softener, anti-oxidants, resins, fatty acids, accelerators, sulfur, zinc oxide, various dips and rayon or nylon fabric. The manufacture begins with the compounding and mixing of the rubber stock in a machine, i.e., a Banbury mixer. The rubber stock is then passed to milling process for further blending and working. The fabric is prepared by vacuum drying, cleaning and treatment with a latex compound, followed by drying and calendering to apply a coating of live rubber. The fabric is formed into sheets which are sized and cut on the bias on a Spadone cutter. The bead wires are rust-proofed, insulated, wrapped in rubber impregnated fabric and formed into the tire bead. The tread is formed from the ruber stock, cut to size and these components, the fabric (plies) beads and tread are brought together on a collapsible revolving drum. The layers of fabric are rolled together to form an open-ended cylinder, the bead is applied and rolled in, the tread is rolled on and the splice points of these units sealed together by hydraulic pressure.

At this stage the tires are cured and formed into the oriented bead, sidewall and tread, with tread design in a vulcanizer which applies heat and pressure. In this operation, using a Bag-O-Matic machine, the open-ended cylinder is placed over an inflatable bag in the center of one-half of the tire mold. The mold is closed to bring the other half thereof around the crude tire, the bag inflated and after the vulcanizing cycle is finished the tire is released.

From the Bag-O-Matic machine the tires are passed to a short conveyor and drop on a split rim. The rim is brought together around the bead and the tire is inflated to 50 lbs. p.s.i. and held at this temperature for about 19 minutes. In an alternate procedure the tire is kept on the rim for a two-cycle period of 38 minutes. Following this, the air is released, the tire taken from the rim and allowed to cool uninflated. The present invention relates to this last series of steps known as the post-inflation cycle as applied in manual processing or with automatic machines.

In accordance with this invention, a cylindrical rim of uniform and true dimensions is placed over the tire so that when it is inflated the tread is pressed against the inside of the rim and radial growth of the tire is prevented after maximum diameter limits are attained. With the rim in contact with the tread and forced thereagainst by the air pressure, any tendency of the tire to grow unevenly at the tread surface and become out-of-round is prevented. This is the crucial stage in the tire processing cycle wherein it has been found that tread unevenness, out-of-roundness and other defects occur.

Figure 1:
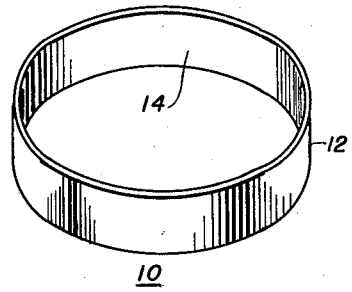
FIGURE 1 is a perspective view of one form of ring to be used in accordance with this invention.
Figure 2:
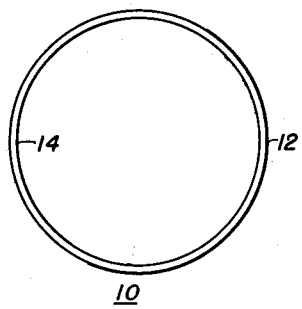
FIGURE 2 is a top view of the embodiment shown in FIGURE 1.
Figure 3:
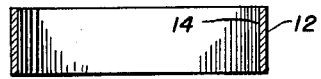
FIGURE 3 is a cross-sectional view of the embodiments shown in FIGURES 1 and 2.
Figure 4:
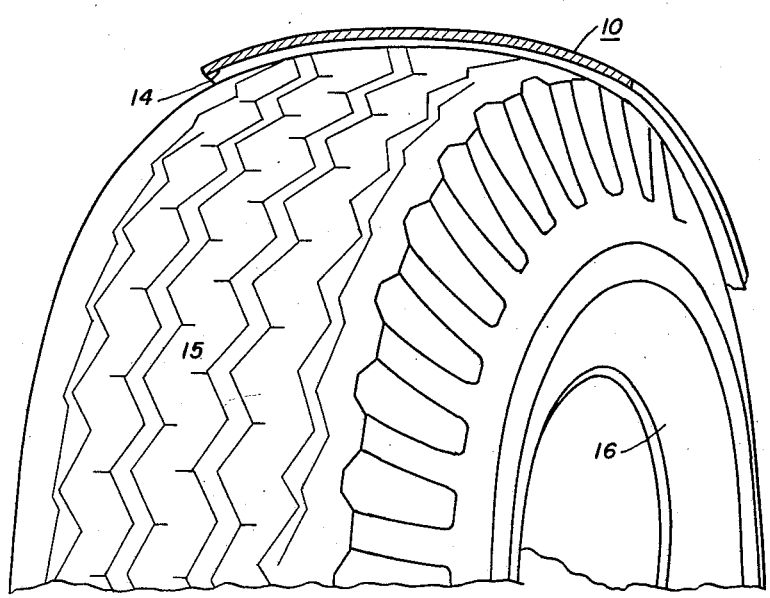
FIGURE 4 is a partial sectional view of a floating ring in position around the tire tread.

In its simplest form, a ring 10 as shown in FIGURES 1, 2, 3 and 4 may be used. Ring 10 has an outer surface 12 which may be any configuration and an inner surface 14 which is machined to a polished cylinder having no irregularities and is of uniform diameter. Ring or rim 10 may be made of steel, cast iron, or any suitable strong material. Lateral surface 14 is preferably slightly curved at a radius from the center of about 16 inches for a 8:00 x 14 tire size so as to match or approximate the general lateral curvature of the tire tread 15 of tire 16 as shown in FIGURE 4.

Figure 5:
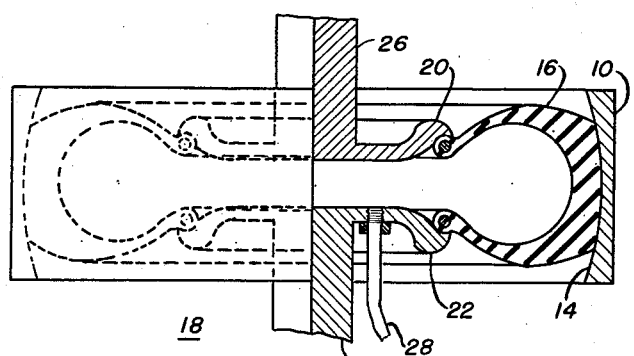
FIGURE 5 is a side view in partial cross-section showing the application of the ring of this invention to a tire mounted on a post-inflation rim with air pressure applied.
Figure 6:
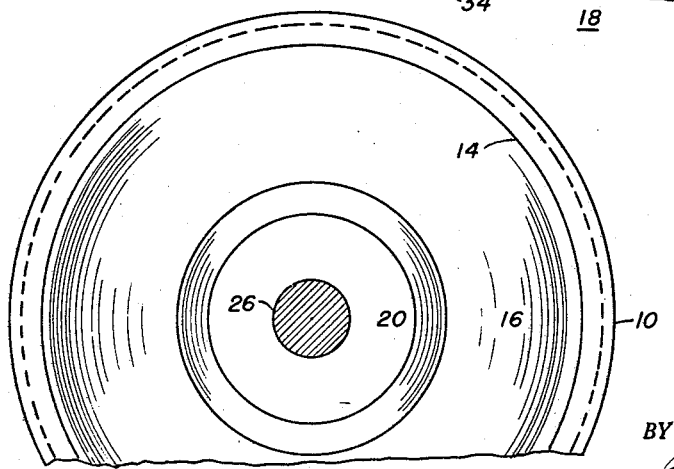
FIGURE 6 is a top view of the embodiment shown in FIGURE 5.

In one aspect of the invention the ring 10 is used during the post-inflation cycle or after the post-inflation cycle, that is, during the last cooling stage. Because tire growth is greater during the initial cooling stages after the tire is removed from the vulcanizer, it is preferred to apply the ring 10 to the tire before or after it is placed on the split-rim for inflation. This is shown in FIGURES 5 and 6 wherein ring 10 is in contact with tire 16 on split rim machine 18 (shown in part only) having upper rim 20 and lower rim 22, held in place by hydraulically operated rods 24 and 26, respectively. Air is introduced and released automatically through conduit 28.

Figure 7:
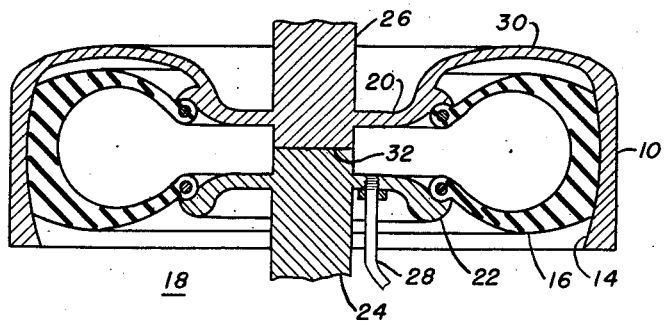
FIGURE 7 is a cross-sectional view of another form of ring made integral with a post-inflation rim with the inflated tire therein.

In FIGURE 7 another arrangement is shown with ring 10 made as an integral part of rim 20 by means of wheel or disc portion 30. Rods 24 and 26 abut at 32 to provide proper rim width under the pressure of the hydraulic force of machine 18.

Figure 8:
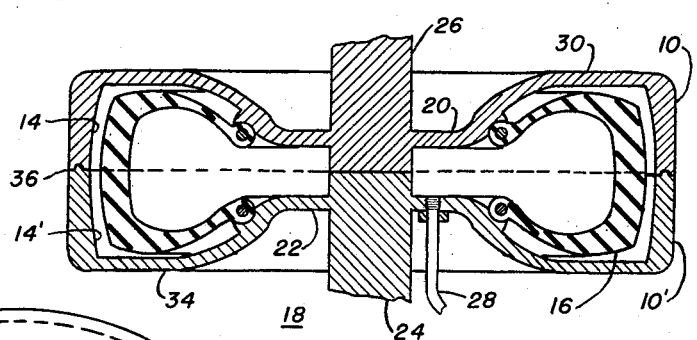
FIGURE 8 is a cross-sectional view of another form of ring wherein the ring is split and each half is attached to one part of the split-rim post-inflation machine with no air pressure applied to the tire.

In FIGURE 8 still another arrangement is shown with ring 10 split in two halves circumferentially. The upper half 10 is attached to rim 20 by means of wheel or disc portion 30 and the lower half 10' is affixed to lower rim 22 by means of wheel or disc portion 34. The circumferential juncture of the ring 10—10' is tongue-and-grooved as indicated at 36. Tire 16 is shown just prior to inflation and its tread is slightly spaced from surfaces 14 and 14' of ring 10—10'. The split rim machine is referred to by numeral 18, and rods 24 and 26 and rims 20 and 22 are the only parts thereof shown since it does not in itself constitute part of this invention except insofar as the ring 10 cooperates with rims 20 and 22 during the postinflation cycle to attain the new result of this invention.

The surface 14 of ring 10 is preferably machined and polished so that it is uniform and smooth. The width of the ring should be at least as wide as the tire tread when the tire is inflated and may be wider than the tire tread. Surface 14 is concave to match or approximate the molded tread radius of the tire. For a 8:00 x 14 size this curvature would be about a 16-inch radius from the center of the tire. Other tire sizes may have different curvatures for surface 14.

The invention has as one of its features the improvement in the post-inflation cycle which comprises confining the vulcanized tire in a restraining means of uniform radius during the cooling step thereby controlling radial tire growth and avoiding the difficulties of uneven diameters, out-of-roundness, and uneven tread surface. The temperatures used during the cord processing and curing cycles may vary depending on the type of tire being constructed and the rubber composition employed. This temperature may vary from about 200° F. to 300° F. and may be as high as 400° F. for certain types of inflatable articles and tires. The inflation pressure as applied to tires may also vary, depending on the type, size and construction. In general, this pressure may vary from 10 to 120 p.s.i., although the post-inflation pressure used is usually about 20 to 40 lbs. above the normal operating pressure of the finished tire. Thus, a size 8:50 x 14 passenger car tire which operates at about 22 to 28 p.s.i. will be subjected to post-inflation cycles carrying pressures ranging from about 36 to about 58 p.s.i. Likewise, the time of the curing and post-inflation cycles used may vary without departing from the spirit of this invention. Curing and post-inflation cycles of from 10 to 40 minutes may be used depending again on the type of tire, its construction and composition.

Although the invention has been described and illustrated by automobile tires and their manufacture, it is equally applicable to the manufacture of any article of rubber construction wherein the problem of internal stresses and out-of-roundness prevail. Thus, the invention may be applied to bicycle tires, automobile tires, truck tires, tractor tires, fabricated balloons, and any inflated or inflatable rubber article having as part of its structure a reinforcing fabric of a different material which causes stresses in the body structure.

What is claimed is:

1. In the manufacture of a pneumatic tire having a synthetic fabric-reinforced body structure and an outer tread surface wherein said tire is vulcanized, removed from the mold, mounted on a split-rim and subjected to cooling under post-inflation conditions, the improvement comprising circumferentially confining said tire at the tread surface only thereof while the sidewalls are unrestrained during said cooling, whereby radial growth, unevenness and out-of-roundness of said tire are minimized.

2. The method of manufacturing a tire having a reinforced synthetic fiber body which comprises the combination of steps of vulcanizing said tire in a mold during a vulcanization cycle, removing said tire from the mold, mounting the heated tire on a split-rim, subjecting the tire to a post-inflation cooling cycle while the sidewalls are unrestrained and the entire tread surface thereof is circumferentially confined to a uniform diameter whereby irregularity, out-of-roundness, and internal stress of said synthetic reinforcing fibers due to tire growth during said cooling are minimized.

3. The method of manufacturing a tire having a reinforced synthetic fiber body which comprises vulcanizing said tire in a mold during a vulcanization cycle, removing said tire from the vulcanizaton mold, immediately mounting said heated tire on a split-rim and inflating same to an internal pressure of about 10–120 p.s.i. and cooling said tire while simultaneously circumferentially confining the entire tread surface thereof to a uniform diameter while the sidewalls are unrestrained, whereby irregularity, out-of-roundness, and internal stress of said synthetic reinforcing fibers due to tire growth during said cooling are minimized.

4. In the manufacture of a pneumatic tire having a synthetic fabric-reinforced body structure and an outer tread surface wherein said tire is vulcanized, removed from the mold, mounted on a rim and subjected to cooling under post-inflation conditions, the improvement comprising circumferentially confining said tire at the tread surface only thereof while the sidewalls are unrestrained during said cooling, whereby radial growth, unevenness and out-of-roundness of said tire are minimized.

References Cited in the file of this patent

UNITED STATES PATENTS

| | | |
|---|---|---|
| 1,605,683 | Meyer et al. | Nov. 2, 1926 |
| 2,110,224 | Havens | Mar. 8, 1938 |
| 2,625,981 | Wallace | Jan. 20, 1953 |
| 2,746,515 | Usack | May 22, 1956 |
| 2,764,207 | Armington | Sept. 25, 1956 |
| 2,766,006 | Kraft | Oct. 9, 1956 |

FOREIGN PATENTS

| | | |
|---|---|---|
| 1,580 of 1956 | Republic of South Africa | Jan. 2, 1957 |